United States Patent [19]

Irvine et al.

[11] Patent Number: 4,504,618
[45] Date of Patent: Mar. 12, 1985

[54] AQUEOUS DISPERSIONS

[75] Inventors: Antony J. Irvine, Maidenhead, England; Bruce Leary; Christopher H. Such, both of Mount Eliza, Australia

[73] Assignee: Dulux Australia Ltd., Melbourne, Australia

[21] Appl. No.: 512,675

[22] Filed: Jul. 11, 1983

[30] Foreign Application Priority Data

Jul. 12, 1982 [AU] Australia ............................. PF4808

[51] Int. Cl.$^3$ ........................... C08J 3/02; C08K 3/20
[52] U.S. Cl. ................................. 524/457; 524/458; 524/459; 524/461; 524/801; 524/803; 524/811; 526/273; 526/282; 526/283; 526/320; 526/333
[58] Field of Search ............... 526/320, 282, 283, 273, 526/333; 524/457, 801, 803, 811, 458, 461

[56] References Cited

U.S. PATENT DOCUMENTS

| | | | |
|---|---|---|---|
| 3,794,608 | 2/1974 | Evani et al. | 526/333 |
| 4,090,992 | 5/1978 | Scanley | 524/801 |
| 4,296,226 | 10/1981 | Braun et al. | 526/333 |
| 4,309,330 | 1/1982 | Ukita et al. | 524/554 |
| 4,322,328 | 3/1982 | Graetz et al. | 524/458 |
| 4,339,371 | 7/1982 | Robinson et al. | 324/458 |
| 4,343,925 | 8/1982 | Chang et al. | 524/542 |
| 4,380,600 | 4/1983 | Hosoda et al. | 524/459 |

FOREIGN PATENT DOCUMENTS

| | | | |
|---|---|---|---|
| 2734801 | 2/1978 | Fed. Rep. of Germany | 524/811 |
| 48-17676 | 5/1973 | Japan | 526/333 |
| 202311 | 12/1982 | Japan | 526/333 |
| WO83/00151 | 1/1983 | PCT Int'l Appl. | |
| 2026341 | 2/1981 | United Kingdom | |
| 2068009 | 5/1981 | United Kingdom | |

OTHER PUBLICATIONS

Chem. Abst. 77-165633m (1972), Filipowicz et al.
Derwent Abst. 80042 T/51, JA0047990 (12-1972), Mitsubishi Rayon.

*Primary Examiner*—Herbert J. Lilling
*Attorney, Agent, or Firm*—Cushman, Darby & Cushman

[57] ABSTRACT

This invention relates to stable aqueous dispersions of film-forming addition polymer.

Novel aqueous dispersions comprise polymer which is a copolymer of amphipathic and non-amphipathic monomer. The amphipathic monomer has an HLB value of at least 8, the hydrophilic component thereof is non-ionic, and the lipophilic component has a molecular weight of at least 100, comprises at least one ethylenic double bond but has no acrylyl or methacrylyl structure. The polymer comprises up to 80% by weight of amphipathic monomer.

The dispersions are useful as components of such compositions as surface coatings and adhesives.

6 Claims, No Drawings

AQUEOUS DISPERSIONS

This invention relates to novel aqueous polymer dispersions and to a process of preparing them by the suspension or emulsion polymerisation of selected ethylenically unsaturated monomers.

The dispersions to which this invention relates consist of particles of polymer derived from ethylenically unsaturated monomer, stably dispersed in an aqueous continuous phase. That is they may be either aqueous suspensions or latices, classes of materials which are important commercial commodities.

These materials are commonly made by the suspension or emulsion polymerisation of monomer dispersed in an aqueous liquid, in the presence of a suitable suspending or emulsifying agent. An explanation of the mechanism involved in these processes and the features which characterises each of them is given, for example, in "Polymer Processes", Interscience Publishing Co., New York, U.S.A. (1956) at pages 69 and 113.

The polymer particles of our invention are derived from ethylenically unsaturated monomers of two distinct types, which we refer to hereinunder as "amphipathic monomer" and "comonomer" respectively. The polymer must comprise at least one monomer selected from each of these types.

The amphipathic monomer consists of a lipophilic component which contains at least one ethylenic double bond but no acrylyl or methacrylyl structure and a non-ionic hydrophilic component attached thereto, the molecule as a whole being further characterised in that it has a hydrophilic-lipophilic balance (H.L.B) of at least 8.

We find it convenient in describing these amphipathic monomers to consider them as having the structure of mono- or di-substituted ethylenes in which substitution has taken place at either or both of the ethylenic carbon atoms. The substituent is a moiety which together with the ethylene moiety constitutes the lipophilic component of the monomer, to which component is attached the hydrophilic component of the molecule.

In describing out amphipathic monomers in this way, we do not infer that they necessarily can or must be built up in that fashion. As a rule, suitable methods of synthesis of the individual amphipathic monomers will be apparent from the particular examples disclosed hereinunder and from an understanding of their composition.

By a lipophilic component, we mean a molecular entity which per se is essentially insoluble in water. For the purpose of this invention we require that the lipophilic component shall have a molecular mass of at least 100 and preferably greater than 135.

Suitable lipophilic components are, for example, eugenol and undecylinic acid. Materials of somewhat lower molecular mass, for example cinnamyl alcohol and norbornene methanol may also be used as lipophilic components, but in general we find their utility is enhanced by increasing their mass, for example in the method described hereinunder.

Alternatively, suitable lipophilic components may be built up from substituted ethylenes which are not useful per se, for example because they are appreciably water soluble or have too low a molecular mass. Materials of this type are, for example, allyl alcohol, methallyl alcohol, itaconic acid, maleic acid and fumaric acid.

In the case of maleic and fumaric acids, for example, the required lipophilic nature can be imparted to them by converting them to derivatives comprising hydrocarbon chains, e.g. by esterifying them with fatty alcohols to the half ester stage.

Another way of increasing the lipophilic nature of the substituted ethylene is to graft onto it a polymeric water-insoluble component, for example a poly(oxypropylene) or a poly(oxybutylene).

The lipophilic component need not be entirely free of moieties which are per se water soluble, provided the component as a whole retains its lipophilic nature. For example, the component may comprise a poly(oxyethylene/oxypropylene) block copolymer.

The lipophilic component may also contain more than one substituted ethylene moiety. For example it may be a polyethylenically unsaturated ether, e.g. pentaerythritol triallyl ether or trimethylolpropane diallyl ether, optionally grafted to a poly(oxypropylene).

The hydrophilic component of the amphipathic monomer is, as mentioned hereinabove, attached to the lipophilic component. It must be soluble per se in the aqueous phase of the dispersion to which it is to be incorporated. That is, if it were not attached to the rest of the amphipathic monomer it would be soluble in the aqueous phase. The hydrophilic component should be non-ionic; we have found that the use of ionic hydrophilic components gives dispersions which are markedly less stable to the addition of electrolyte.

Thus suitable hydrophilic components are, for example, poly(vinyl alcohol), poly(acrylamide), poly(vinyl pyrrolidone) and especially preferred, poly(ethylene oxide).

The proportion of hydrophilic moiety in the molecule is governed by the requirement that the molecule as a whole shall have an H.L.B of at least 8.

Numerous methods have been proposed for the determination of H.L.B values, several of which are reviewed in Part II of "Emulsions and Emulsion Technology", Marcel Dekker Inc., New York, edited by Kenneth J. Lissant. For the purpose of this invention, we have found that satisfactory accuracy is given by the approximate determination given on page 740 of that publication.

According to that method, the H.L.B value of a material is estimated by observing its dispersibility in water, aided if necessary by first melting or softening it in water, then cooling to room temperature. The formation of a stable, milky dispersion, translucent dispersion or clear solution, approximates to various levels of H.L.B value from 8 upwards. Materials which will not disperse or which give poor dispersion in water, have lower H.L.B. values than are required for our purpose.

The comonomer to be used in our invention must also be ethylenically unsaturated and is selected so far as its water solubility is concerned, in line with the established practices of dispersion and latex preparative methods. In general this will mean that the monomer will be sparingly soluble in water, typically with a solubility of less than 10% by weight, but giving rise to a polymer which is insoluble in water.

The comonomer may be a single monomer or a mixture of two or more monomers, which may optionally include a minor proportion of an essentially water-insoluble monomer, provided the mixture as a whole has the desired solubility characteristics.

Thus suitable comonomer may be selected from for example, ethyl acrylate, butyl acrylate, hydroxy butyl acrylate, 2-ethoxy ethyl acrylate, glycidyl acrylate, methyl methacrylate, ethyl methacrylate, butyl methacrylate, stearyl methacrylate, methacrylic acid, methoxy propyl methacrylate, cyclohexyl methacrylate, benzyl methacrylate, hydroxyethyl methacrylate, hydroxy propyl methacrylate, dimethylaminoethyl methacrylate, N-butoxymethyl methacrylamine, N-butoxymethyl acrylamide, glycidyl methacrylate, vinyl acetate, vinyl propionate, styrene, 1-methyl styrene, vinyl toluene, methoxy styrene and vinyl pyridine, di-butyl maleate and vinyl chloride.

The known techniques of suspension and emulsion polymerisation, including the selection of appropriate polymerisation initiators, are applicable to the preparation of the aqueous dispersions of our invention. Thus, either thermally-activated or redox initiators may be used. It is often desirable to carry out the preparations without resorting to the addition of conventional suspending or emulsifying agents. This can be important in some applications, where the presence of such materials detracts from the performance of products derived from the polymer dispersion. Our novel compositions offer us the facility to prepare dispersions without such additions. This can be done even in the absence of acidic monomer (such monomers are known to enhance stability). In this case, we have found it preferable to use redox initiators.

Additions of conventional surface active agents can, and often are, used in the process for special purposes, for example to control disperse particle size or to provide a more robust manufacturing process.

The concentration of amphipathic monomer relative to the total unsaturated monomer which may be usefully employed depends on numerous factors but is usually limited in practice to 80% by weight. When the final dispersion is intended for use as a surface coating, the water sensitivity of the hydrophilic component of the amphipathic monomer becomes an important factor and for this application we usually prefer to limit the concentration of amphipathic monomer to 0.3–20.0% by weight.

The mechanism whereby our amphipathic monomer enters into the polymerisation reaction in our compositions is not entirely clear to use, but it does appear to copolymerise with a wide range of comonomers. For example, many of the most commercially useful of our comonomers fall within the sub-class of acrylyl and methacrylyl monomers. These materials usually copolymerise readily with each other, but the amphipathic ethylenically unsaturated monomers of this invention contain only ethylenic unsaturation of a type which, when listed at all in such standard works of reference as "Polymer Handbook", Second edition, Brandrup and Immergut, John Wiley and Sons, New York, 1975, would appear from their tabulated reactivity ratios to be most unfavourably disposed to copolymerise with comonomers of the type listed hereinabove.

Furthermore, without hereby implying any limitation on the scope of our invention, it does appear that the disperse particles formed as a result of the polymerisation reaction are much more complex in structure than might be expected from a conventional suspension or emulsion polymerisation preparation. For example, there is some indication that the surface shell of the particles is richer in polymer comprising amphipathic monomer than the interior.

The novel aqueous dispersions of this invention are useful as components of, for example, surface coatings and adhesives.

The invention is illustrated by the following examples in which all parts are expressed by weight.

EXAMPLE 1

Preparation of a polymer dispersion in which the amphipathic monomer is a poly(oxyethylene) modified undecylenic acid. The lipophilic component has a molecular weight of 183.

The amphipathic monomer of this example was prepared by reacting 1 mol of undecylenic acid with 35 mol of ethylene oxide. The amphipathic monomer thus prepared had an HLB value of at least 8 as evidenced by the results of the test hereinbefore described.

An emulsion reaction polymerisation vessel was charged with 50.4 parts of demineralised water and 0.68 parts of the amphipathic monomer and heated with stirring to 75° C. The following mixtures were then added in order:
1. methyl methacrylate—1.25 parts; ethyl hexyl acrylate—0.88 parts; methacrylic acid—0.10 parts.
2. 0.88 parts of an initiator and buffer solution made of 3.40 parts sodium persulphate, 2.37 parts sodium borate and 94.23 parts demineralised water.

The charge was then heated with stirring from 75° C. to 85° C. over a period of 45 mins.

The following two feed solutions were then added concurrently and at a uniform rate over a period of 2½ hr, keeping the temperature throughout at 85°–90° C.:
1. methyl methacrylate—22.5 parts; ethyl hexyl acrylate—17.7 parts; 75% aqueous soln. sodium dioctyl sulphosuccinate—1.18 parts.
2. 3.27 parts of said initiator and buffer solution.

The batch was then held at 85°–90° C. for an additional 10 mins; a further 0.66 parts of initiator and buffer solution added and the product cooled to room temperature. When cool, 0.11 parts of a fungicide (Proxel*P.L—*trade mark) and 0.35 parts of aqueous ammonium hydroxide were added to give a pH of 9.0–9.5.

The product was a stable aqueous dispersion with a solid content of 44% by wt. The stability was demonstrated by subjecting separate samples to the following tests:
1. 10 parts of dispersion remained stable when mixed with 10 parts of a 10% by wt. aqueous solution of calcium chloride.
2. The dispersion was diluted with 2-butoxy ethanol to a concentration of 20% by wt. in the continuous phase of the dispersion, without loss of stability.
3. The dispersion remained stable when subjected to mechanical shear is a high shear cone and plate viscometer.

EXAMPLE 2

Preparation of a polymer dispersion in which the amphipathic monomer is a modified norbornene methanol. The molecular weight of the lipophilic component is 519.

The amphipathic monomer was prepared by reacting 1 mol of norbornene methanol 5 mol of butylene oxide and then 40 mol of ethylene oxide. The amphipathic monomer thus prepared had an HLB value of at least 8 as evidenced by the results of the test hereinbefore described.

A stable aqueous dispersion of 44% by wt. solids was prepared by the general method of example 1 but substituting an equal weight of the above amphipathic monomer for the amphipathic monomer of example 1.

EXAMPLE 3

Preparation of a polymer dispersion in which the amphipathic monomer is a modified cinnamyl alcohol. The molecular weight of the lipophilic component is 385.

The amphipathic monomer was prepared by reacting 1 mol of cinnamyl alcohol with 3 mol of butylene oxide and then 35 mol of ethylene oxide. The amphipathic monomer thus prepared had an HLB value of at least 8 as evidenced by the results of the test hereinbefore described.

A stable aqueous dispersion of 43.5% by wt solids was prepared by the general method of example 1 but substituting an equal weight of the abovementioned amphipathic monomer for the amphipathic monomer of example 1.

EXAMPLE 4

Preparation of a polymer dispersion in which the amphipathic monomer is a modified maleic anhydride. The molecular weight of the lipophilic component is 1794.

The amphipathic monomer was prepared by reacting in order 1 mol of ethanol, 40 mol of ethylene oxide, 10 mol of butylene oxide and 1 mol of maleic anhydride. The amphipathic monomer thus prepared had an HLB value of at least 8 as evidenced by the results of the test hereinbefore described.

A stable dispersion of 43.5% solids by weight was prepared by the general method of example 1 but substituting an equal weight of the abovementioned amphipathic monomer for the amphipathic monomer of example 1.

EXAMPLE 5

Preparation of a polymer dispersion in which the amphipathic monomer is according to Example 1 and no conventional emulsifier or suspending agent is used in the process.

An emulsion polymerisation reaction vessel was charged with 62.2 parts of demineralised water and 1.67 parts of amphipathic monomer then heated with stirring to 75° C. The following mixtures were then added in order:
1. methyl methacrylate—3.08 parts; ethyl hexyl acrylate—2.18 parts; methacrylic acid—0.25 parts.
2. 2.18 parts of an initiator and buffer solution according to example 1.

The charge was then heated with stirring from 75° C. to 85° C. over a period of 45 mins.

The following two feed solutions were then added concurrently and at a uniform rate over a period of 2½ hr, keeping the temperature at 85°–90° C. throughout.
1. methyl methacrylate—13.9 parts; ethyl hexyl acrylate—11.0 parts.
2. 2.01 parts of initiator and buffer solution as for example 1.

The charge was then held at 85°–90° C. for an additional 10 mins, a further 1.62 parts of initiator and buffer solution added and the product cooled to room temperature.

The resultant product was a white, bit-free stable dispersion of 30.2% by wt. solids.

EXAMPLE 6

Preparation of a polymer dispersion in which the amphipathic monomer is according to Example 1 and no conventional emulsifier or suspending agent is used in the process.

An emulsion polymerisation vessel was charged with 45.00 parts of demineralised water 0.25 parts of amphipathic monomer and heated with stirring to 60°–65° C. The following mixtures were then added in order:
1. methyl methacrylate—1.11 parts; butyl acrylate—1.11 parts.
2. 0.44 parts of initiator solution I, made of 6.04 parts of ammonium persulphate and 93.96 parts of demineralised water.
3. 0.44 parts of initiator solution II, made of 6.04 parts of sodium metabisulphite and 93.96 parts of demineralised water.

The charge was the held at 60°–65° C. with stirring for a period of 45 minutes.

The following three feed solutions were then added concurrently and at a uniform rate over a period of 2½ h keeping the temperature at 60°–65° C. throughout:
1. methyl methacrylate—20.27 parts; butyl acrylate—20.27 parts; amphipathic monomer as described in example 1—2.5 parts.
2. 1.89 parts of initiator solution I
3. 1.89 parts of initiator solution II.

The charge was then held at 60°–65° C. for an additional 10 mins, a further 0.44 parts of initiator solution I added and then 0.44 parts of initiator solution II and the product cooled to room temperature. Aqueous ammonium hydroxide was added to give a pH of 9.0–9.5.

The resultant product was a bit-free stable dispersion of 44.5% solids by weight.

EXAMPLE 7

Preparation of a polymer dispersion in which the amphipathic monomer is a poly(oxyethylene) modified undecylenic acid.

The amphipathic monomer was prepared by reacting 1 mole of undecylenic acid with 25 moles of ethylene oxide. The amphipathic monomer thus prepared had an HLB value of at least 8 as evidenced by the results of the test hereinbefore described.

A stable bit-free aqueous dispersion of 46% solids by weight was prepared by the general method of example 6 but substituting an equal weight of the abovementioned amphipathic monomer for the amphipathic monomer of example 6.

EXAMPLE 8

Preparation of a polymer dispersion in which the amphipathic monomer is a modified undecylenic acid. The molecular weight of the lipophilic component is 297.

The amphipathic monomer was prepared by reacting 1 mole of undecylenic acid with 1 mole of allyl glycidyl ether and then 35 moles of ethylene oxide. The amphipathic monomer thus prepared had an HLB value of at least 8 as evidenced by the results of the test hereinbefore described.

A stable bit-free aqueous dispersion of 46% weight solids was prepared by the general method of example 6 but substituting an equal weight of the abovementioned amphipathic monomer for the amphipathic monomer of example 6.

EXAMPLE 9

Preparation of a polymer dispersion in which the amphipathic monomer is a modified o-phenyl phenol. The molecular weight of the lipophilic component is 283.

The amphipathic monomer was prepared by reacting 1 mole of o-phenyl phenol with 1 mole of allyl glycidyl ether and then 35 moles of ethylene oxide. The amphipathic monomer thus prepared had an HLB value of at least 8 as evidenced by the results of the test hereinbefore described.

A stable bit-free aqueous dispersion of 45% weight solids was prepared by the general method of example 6 but substituting an equal weight of the abovementioned amphipathic monomer for the amphipathic monomer of example 6.

EXAMPLE 10

Preparation of a polymer dispersion in which the amphipathic monomer is a modified o-phenyl phenol. The molecular weight of the lipophilic component is 502.

The amphipathic monomer was prepared by reacting 2 moles of o-phenyl phenol with 3 moles of allyl glycidyl ether and then 70 moles of ethylene oxide. The amphipathic monomer thus prepared had an HLB value of at least 8 as evidenced by the results of the test hereinbefore described.

A stable bit-free aqueous dispersion of 45.5% weight solids was prepared by the general method of example 6 but substituting an equal weight of the abovementioned amphipathic monomer for the amphipathic monomer of example 6.

EXAMPLE 11

Preparation of a polymer dispersion in which the amphipathic monomer is a modified o-phenyl phenol. The molecular weight of the lipophilic component is 397.

The amphipathic monomer was prepared by reacting 1 mole of o-phenyl phenol with 2 moles of allyl glycidyl ether and then 35 moles of ethylene oxide. The amphipathic monomer thus prepared had an HLB value of at least 8 as evidenced by the results of the test hereinbefore described.

A stable bit-free aqueous dispersion of 46% weight solids was prepared by the general method of example 6 but substituting an equal weight of the abovementioned amphipathic monomer for the amphipathic monomer of example 6.

EXAMPLE 12

Preparation of a polymer dispersion in which the amphipathic monomer is a modified o-phenyl phenol. The molecular weight of the lipophilic component is 397.

The amphipathic monomer was prepared by reacting 1 mole of o-phenyl phenol with 2 moles of allyl glycidyl ether and then 50 moles of ethylene oxide. The amphipathic monomer thus prepared had an HLB value of at least 8 as evidenced by the results of the test hereinbefore described.

A stable bit-free aqueous dispersion of 45.5% weight solids was prepared by the general method of example 6 but substituting an equal weight of the abovementioned amphipathic monomer for the amphipathic monomer of example 6.

EXAMPLE 13

Preparation of a polymer dispersion in which the amphipathic monomer is a modified pentaerythritol triallyl ether. The molecular weight of the lipophilic component is 423.

The amphipathic monomer was prepared by reacting 1 mole of pentaerythritol triallyl ether with 2 moles of butylene oxide and then 35 moles of ethylene oxide. The amphipathic monomer thus prepared had an HLB value of at least 8 as evidenced by the results of the test hereinbefore described.

A stable bit-free aqueous dispersion of 45% by weight solids was prepared by the general method of example 6 but substituting an equal weight of the above amphipathic monomer for the amphipathic monomer of example 6.

EXAMPLE 14

Example of the use of an ethylenically unsaturated species which is not a copolymerisable monomer. The molecular weight of the lipophilic component is 281.

An amphipathic compound was made by reacting one mole of oleic acid with 35 moles of ethylene oxide. The amphipathic compound thus prepared had an HLB value of at least 8 as evidenced by the results of the test hereinbefore described. Oleic acid-ethylene oxide reaction products such as this are well known to the art and are widely used as surfactants.

An aqueous dispersion of 42% by wt. solids was prepared by the general method of example 1 but substituting an equal weight of the abovementioned amphipathic compound for the amphipathic monomer of example 1. The dispersion was subjected to the three tests of example 1 with the following results:

1. The dispersion became unstable when the calcium chloride was added;
2. The dispersion remained stable after the addition of 2-butoxy ethanol; and
3. The latex became unstable when subjected to the mechanical sheer of the cone and plate viscometer.

The dispersion prepared with the oleic acid compound was thus unsatisfactory. This, we believe, is because the oleic acid, although otherwise possessing all of the features of the lipophilic components according to the invention, does not copolymerise with unsaturated monomer to any significant degree.

We claim:

1. An aqueous dispersion of particles of film-forming addition polymer wherein the polymer is a copolymer of at least two ethylenically unsaturated monomers, characterised in that:
    (a) at least one comonomer is an amphipathic monomer having an HLB value of at least 8 and consisting of a lipophilic component and a hydrophilic component, the hydrophilic component being non-ionic, and the lipophilic component having a molecular weight of at least 100, comprising at least one ethylenic double bond; and lacking acrylyl or methacrylyl residues; and
    (b) at least one comonomer is non-amphipathic;
    (c) said amphipathic comonomer comprising up to 80% by weight of the copolymer.
2. An aqueous dispersion according to claim 1, characterised in that the amphipathic monomer comprises from 0.3–20% by weight of the copolymer.

3. An aqueous dispersion according to claim 1, characterised in that the lipophilic component has a molecular weight of at least 135.

4. An aqueous dispersion according to claim 1, characterised in that at least one ethylenic double bond is allylic.

5. An aqueous dispersion according to claim 4, characterized in that said lipophilic component of the amphiphatic monomer comprises an allylic compound selected from pentaerythritol triallyl ether and trimethylolpropane diallyl ether.

6. An aqueous dispersion according to claim 1, characterised in that the non-amphipathic comonomer comprises acid comonomer.

* * * * *